United States Patent
Wu et al.

(10) Patent No.: US 11,758,206 B1
(45) Date of Patent: Sep. 12, 2023

(54) ENCODING MEDIA CONTENT FOR PLAYBACK COMPATIBILITY

(71) Applicant: Amazon Technologies, Inc., Seattle, WA (US)

(72) Inventors: Yongjun Wu, Bellevue, WA (US); Alex Zhang, Seattle, WA (US); Kyle Bradley Koceski, Seattle, WA (US); Matthew Scharr, Portland, OR (US); Viriya Ratanasangpunth, Portland, OR (US); Michael Kale, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/249,781

(22) Filed: Mar. 12, 2021

(51) Int. Cl.
| | |
|---|---|
| H04N 21/2368 | (2011.01) |
| H04N 21/2365 | (2011.01) |
| G10L 19/16 | (2013.01) |
| H04N 21/234 | (2011.01) |
| H04N 21/2387 | (2011.01) |
| H04N 21/643 | (2011.01) |
| H04N 21/236 | (2011.01) |

(52) U.S. Cl.
CPC ....... *H04N 21/2365* (2013.01); *G10L 19/167* (2013.01); *H04N 21/2368* (2013.01); *H04N 21/2387* (2013.01); *H04N 21/23424* (2013.01); *H04N 21/23611* (2013.01); *H04N 21/643* (2013.01)

(58) Field of Classification Search
CPC ......... H04N 21/2368; H04N 21/23611; H04N 21/2365; H04N 21/23424; H04N 21/2387; H04N 21/643
See application file for complete search history.

(56) References Cited

U.S. PATENT DOCUMENTS

| | | | | |
|---|---|---|---|---|
| 6,993,081 | B1 * | 1/2006 | Brunheroto | H04N 21/23406 375/E7.014 |
| 10,313,722 | B1 * | 6/2019 | Searl | H04N 21/26258 |
| 2003/0123556 | A1 * | 7/2003 | Komori | G11B 27/3027 375/240.26 |
| 2009/0169177 | A1 * | 7/2009 | Ui | H04N 5/85 386/338 |
| 2011/0007797 | A1 * | 1/2011 | Palmer | G11B 27/034 375/240.01 |
| 2011/0103468 | A1 * | 5/2011 | Polisetty | H04N 21/234363 375/240.03 |
| 2014/0140417 | A1 * | 5/2014 | Shaffer | H04N 21/8456 375/240.28 |
| 2015/0382056 | A1 * | 12/2015 | Burton | G11B 27/02 725/25 |
| 2016/0066007 | A1 * | 3/2016 | Zhang | H04N 21/8456 725/116 |

(Continued)

*Primary Examiner* — Pinkal R Chokshi
(74) *Attorney, Agent, or Firm* — Weaver Austin Villeneuve & Sampson LLP

(57) ABSTRACT

Methods and apparatus are described for encoding and delivering secondary content (e.g., advertisements) for insertion in primary content (e.g., live events, movies, and television shows). Secondary content is encoded such that the duration of any audio component of the secondary content is equal to or longer than the video component duration. When the secondary content is inserted, the overall duration of the inserted content is specified to be equal to the video component duration.

18 Claims, 6 Drawing Sheets

(56) References Cited

U.S. PATENT DOCUMENTS

| | | | |
|---|---|---|---|
| 2016/0100211 A1* | 4/2016 | Toma | H04N 21/2368 |
| | | | 725/116 |
| 2016/0360217 A1* | 12/2016 | Wan | H04N 21/44 |
| 2018/0376177 A1* | 12/2018 | Nugent | H04L 67/02 |
| 2021/0089259 A1* | 3/2021 | Zheng | G06F 3/165 |
| 2021/0375304 A1* | 12/2021 | Purnhagen | H04N 21/2368 |

* cited by examiner

US 11,758,206 B1

ENCODING MEDIA CONTENT FOR PLAYBACK COMPATIBILITY

BACKGROUND

Many media players and client devices that access online media content employ an adaptive bitrate streaming protocol based on an open standard known as Dynamic Adaptive Streaming over HTTP (DASH) to request successive fragments of the content for decoding, rendering, and display. Manifest data are provided to the media player in the form of one or more XML files that provide the player with the information it needs to generate properly formatted requests for the audio, video, and subtitle fragments of the content. The manifest data often include multiple options for video and audio streams, each including video and audio fragment at different resolutions, quality levels, bitrates, etc.

Streaming content (which may represent live events, broadcast content, or video-on-demand) often includes both primary content and secondary content (e.g., advertising) that is inserted in or "stitched" with the primary content. In some cases, the secondary content is inserted as distinct periods of content that alternate with periods of the primary content. And while video fragments can be generated with exact durations (e.g., 2 seconds), audio sampling techniques do not always allow for audio fragments to be generated with durations that match the exact duration of the video fragments. Because the durations of audio fragments and their corresponding video fragments are often different, this may result in media timeline gaps between the audio or video components of successive periods. This may be understood with reference to FIG. 1.

In the depicted example, three advertisements (Ad 1, Ad 2, and Ad 3) are inserted as three distinct periods between two periods of primary content. Each period of primary and ad content includes three components; one video component and two audio components. One of the audio components is an Advanced Audio Coding (AAC) stream while the other is a Dolby® Digital Plus (DD+) stream. As can be seen in the depicted example, the overall duration of each ad period is determined by its longest component. Because the beginnings of the components in each period are aligned, this results in media timeline gaps 102 between the shorter components in each period and the corresponding components of the following period. While some media players and client devices may be equipped to handle such gaps, there are many that cannot, resulting in an unacceptably high failure rate.

DETAILED DESCRIPTION

This disclosure describes techniques for encoding media content (e.g., advertisements or other secondary content) intended for insertion in primary content streams to achieve a greater degree of compatibility with the large and diverse population of media players and client devices. This is achieved, in part, by enforcing a constraint on the duration of the audio component(s) of each item of content intended for stitching with primary content. In particular, each item of content is produced such that the duration of each audio component of that content item is equal to or greater than the duration of the video component of that item. In some cases, the extent to which the audio duration is allowed to exceed the video duration may also have a defined upper limit. For the purpose of insertion of a particular item of content, the overall duration for that content item is selected to be the same as the duration of that content item's video component. An example will be instructive.

Figure 1:
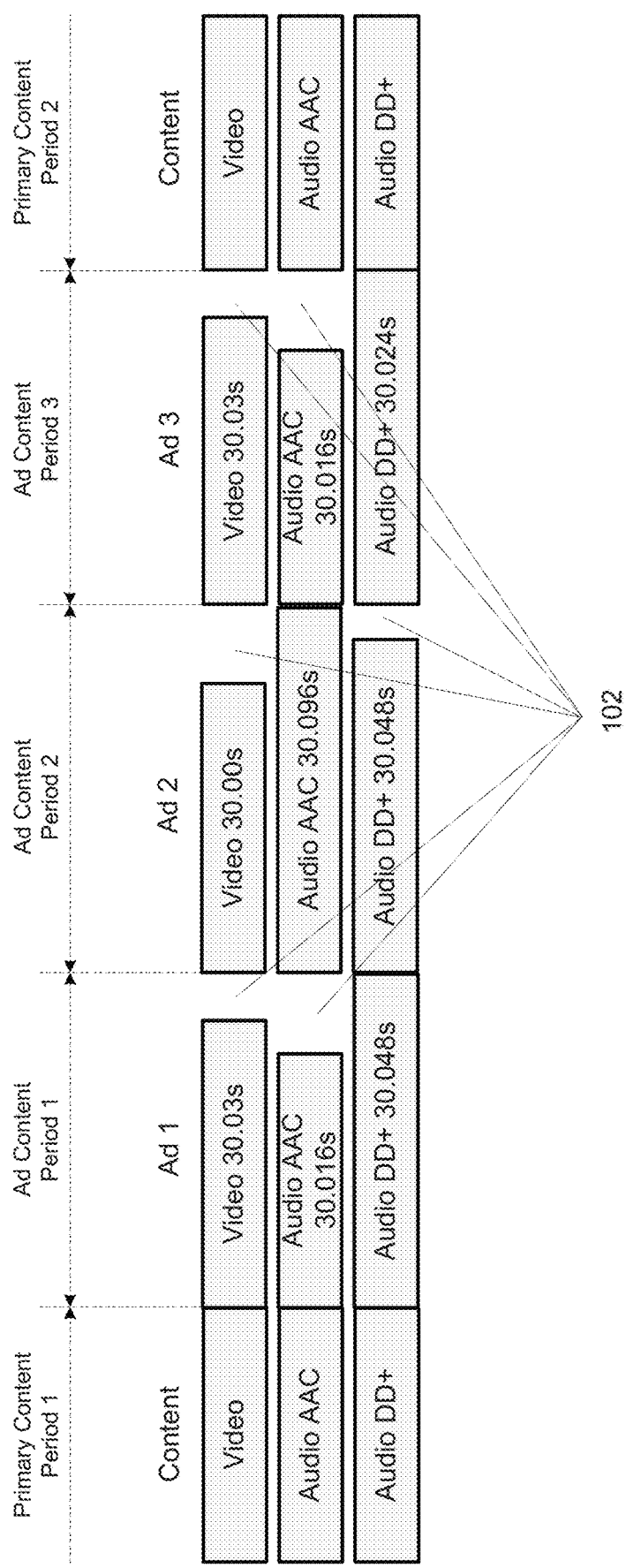
FIG. 1 is an illustration of media timeline gaps that may occur with stitched content.
Figure 2:
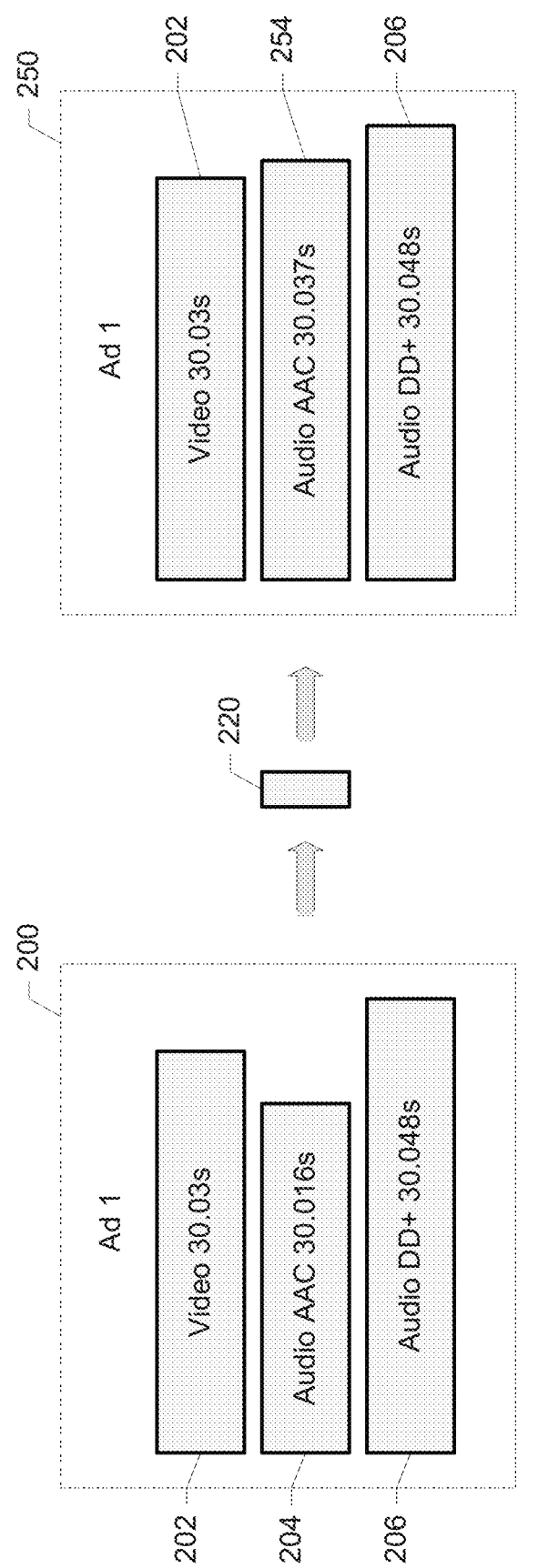
FIG. 2 is an illustration of enforcement of a constraint on the durations of audio components of a media presentation as enabled by the present disclosure.

FIG. 2 illustrates an example of the enforcement of a constraint on the durations of the two audio components of a media presentation as enabled by the present disclosure. In the depicted example, before the constraint is enforced the encoded video and audio components of media presentation 200 (e.g., Ad 1 from FIG. 1) include video component 202 with a playback duration of 30.03 seconds, an AAC audio component 204 with a playback duration of 30.016 seconds, and a DD+ audio component 206 with a playback duration of 30.048 seconds. That is, the ACC component is 14 milliseconds shorter than the video component while the DD+ component is 18 milliseconds second longer.

The constraint requires that the duration of an audio component of a media presentation must be longer than the duration of the video component. In this example, DD+ component 206 satisfies this part of the constraint but AAC component 204 does not. Therefore, according to a particular class of implementations, one or more additional frames of audio are added to AAC component 204 such that this part of the constraint is met.

The constraint may also require that the duration of an audio component is not greater than a defined upper limit. According to some implementations, this upper limit is defined as the sum of the duration of the video component and the duration of one frame of audio. For example, if one audio frame has 1024 samples in its time dimension and a sampling frequency of 48 KHz is used, the duration of an audio frame is 1024/48000≈21 milliseconds. Because the duration of the DD+ component 206 is 18 milliseconds longer than the duration of video component 202, it satisfies this part of the constraint. With regard to AAC component 204, it is clear that the addition of a single frame 220 would meet both parts of the constraint. This is represented in FIG. 2 by modified media presentation 250 that includes video component 202, modified AAC component 254, and DD+ component 206.

At playback, manifest data are provided to a requesting client device that specify the overall duration for media presentation 250 as being the same as the duration of video component 202, i.e., 30.03 seconds. Because video duration 202 is the shortest of the component durations, this effectively eliminates any media timeline gaps between media presentation 250 and the subsequent period of media content with which media presentation is stitched. Therefore, any media players that have difficulty handling such gaps will not crash for this reason. The handling of any overlaps of audio components will be discussed below.

Figure 3:
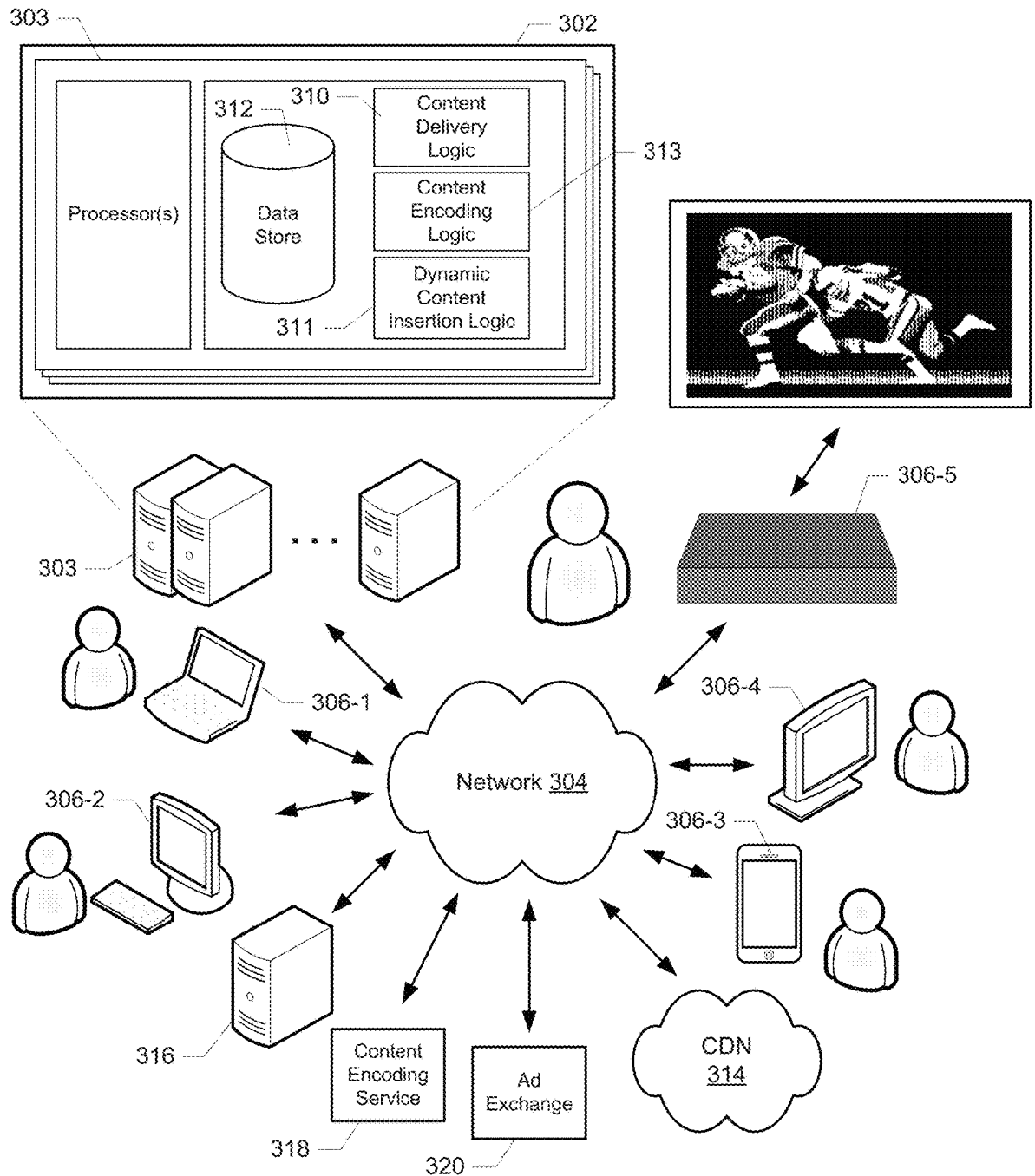
FIG. 3 is a simplified diagram of a computing environment in which implementations enabled by the present disclosure may be practiced.

FIG. 3 illustrates an example of a computing environment in which a video content service 302 provides streaming content via network 304 to a variety of client devices (306-1 through 306-5) in accordance with the techniques described herein. Content service 302 may conform to any of a wide variety of architectures such as, for example, a services platform deployed at one or more co-locations, each implemented with one or more servers 303. Network 304 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 306 may be any suitable device capable of connecting to network 304 and consuming content provided by service 302. Such devices may include, for example, mobile devices (e.g., cell phones, smart phones, and tablets), personal computers (e.g., laptops and desktops), set top boxes (e.g., for cable, satellite, and online systems), smart televisions, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 302. Alternatively, such resources may be independent of content service 302, e.g., on a platform under control of a separate provider of computing resources with which content service 302 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 302 is described as if it is integrated with the platform(s) that encodes the content, and provides both the primary and secondary content to client devices. However, it will be understood that content service 302 may provide access to content in conjunction with one or more content delivery networks (e.g., CDN 314) that may or may not be independent of content service 302. In addition, the source(s) of one or both of the primary and secondary content (and the encoding resources used to encode the content) may or may not be independent of content service 302 (e.g., as represented by content provider server 316, content encoding service 318, and ad exchange 320). The range of variations known to those of skill in the art are contemplated to be within the scope of this disclosure.

The various implementations enabled by the present disclosure contemplate logic resident on the client devices consuming video content from content service 302; such logic being configured to handle overlaps between audio components of live streaming content as described herein. Such logic might be part of an existing algorithm or module on the client device or implemented to work in conjunction with such an algorithm or module.

It should also be noted that implementations are contemplated in which, in addition to content delivery logic 310 (which facilitates various aspects of content delivery to client devices 306), content service 302 may include other types of logic. For example, dynamic content insertion logic 311, which facilitates the dynamic insertion of secondary content in primary content, may be configured to dynamically combine manifest data associated with primary live content (e.g., from data store 312 or received from content provider 318) with manifest data associated with advertising content (e.g., received from ad exchange 320), or manifest data corresponding to static content such as studio logos or alternate language credits (e.g., from data store 312 or received from content provider 318). As part of this, logic 311 may also be configured to specify (e.g., in the manifest data) that the period duration for a given content item corresponds to the duration of that item's video component.

In another example, content service 302 may include content encoding logic 313 that is configured to encode video content in a way that enforces the constraint(s) on the relationship between the durations of audio and video components as enabled by the present disclosure. Such encoding logic may employ any of a variety of video encoding standards such as, for example, AVC (H.264), HEVC (H.265), AV1, VP8, VP9, etc., as well as any of a variety of file formats including, for example, MP4, CMAF, etc.

In addition to providing access to video content, content service 302 may also include a variety of information related to the video content (e.g., other associated metadata and manifests in data store 312 to which service 302 provides access). Alternatively, such information about the content, as well as the content itself may be provided and/or hosted by one or more separate platforms, e.g., CDN 314. It should be noted that, while logic 310, 311, and 313, and data store 312 are shown as integrated with content service 302, implementations are contemplated in which some or all of these operate remotely from the associated content service, and/or are under the control of an independent entity. From these examples, those of skill in the art will understand the diversity of use cases to which the techniques described herein are applicable.

Figure 4:
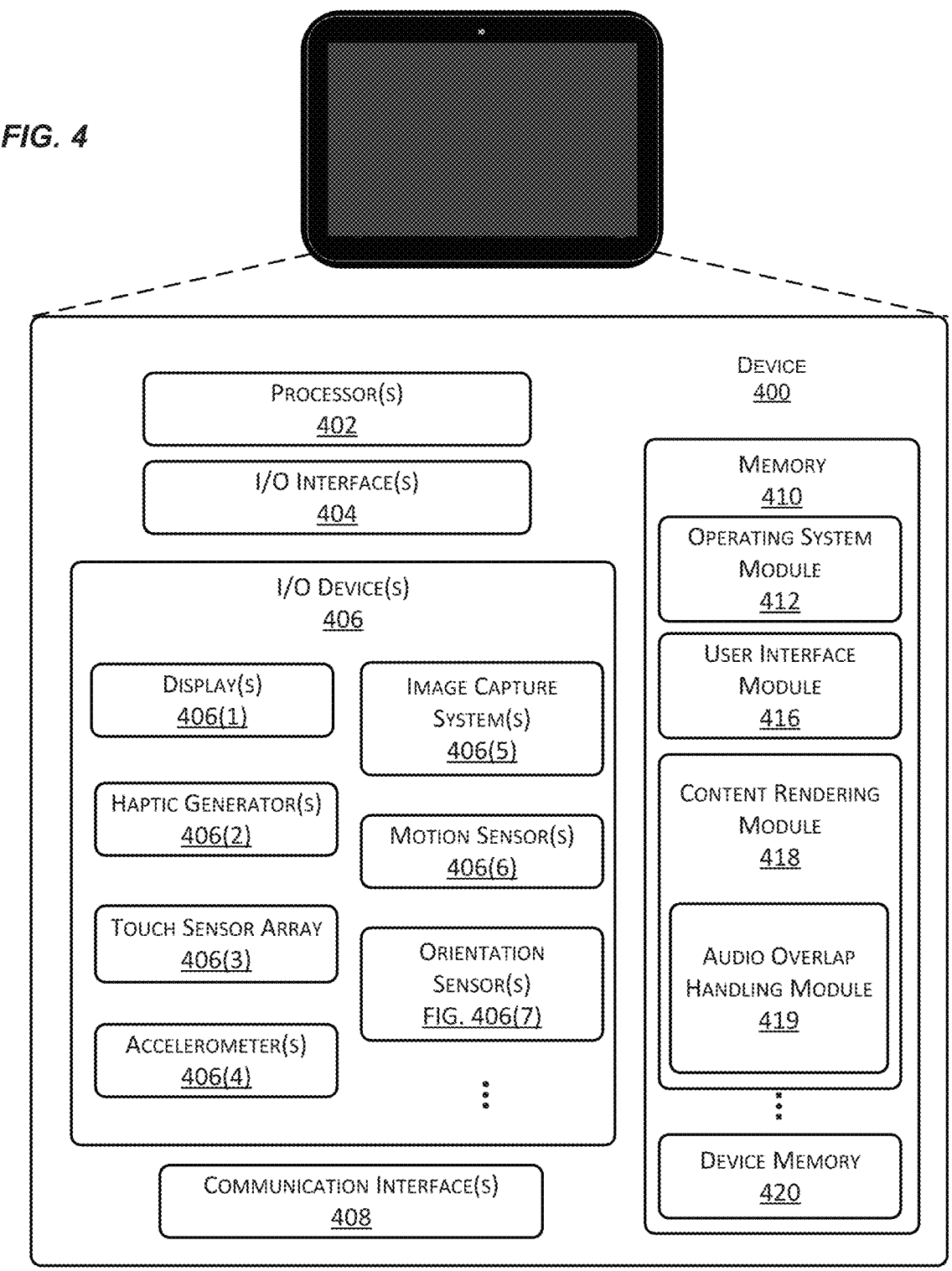
FIG. 4 is a simplified diagram of a client device that may be employed with implementations enabled by the present disclosure.

A block diagram of an example of a client device 400 suitable for use with various implementations is shown in FIG. 4. As mentioned above, it should be understood that device 400 may be any of a wide variety of device types. Device 400 (depicted as a tablet device) includes one or more single or multi-core processors 402 configured to execute stored instructions (e.g., in device memory 420). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 404 is coupled to one or more I/O devices 406 which may or may not be integrated with client device 400.

Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G, 4G, or 5G cellular network, a WiFi LAN and a Bluetooth PAN. Device 400 also includes one or more buses or other internal communications hardware or software (not shown) that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules and other data for the operation of device 400. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 410 includes at least one operating system (OS) module 412 configured to manage hardware resources such as I/O interfaces 404 and provide various services to applications or modules executing on processor(s) 402. Memory 410 also includes a user interface module 416, a content rendering module 418, and other modules. Memory 410 also includes device memory 420 to store a wide variety of instructions and information using any of a variety of formats including, for example, flat files, databases, linked lists, trees, or other data structures. Such information includes content for rendering and display on display 406(1) including, for example, any type of video content. In some implementations, a portion of device memory 420 may be distributed across one or more other devices including servers, network attached storage devices, and so forth.

The logic used to handle overlaps between the audio components of successive periods of content (represented by 419 in FIG. 4) may be implemented in a variety of ways, e.g., in hardware, software, and/or firmware. It will also be understood that device 400 of FIG. 4 is merely an example of a device with which various implementations enabled by the present disclosure may be practiced, and that a wide variety of other devices types may also be used (e.g., devices 306-1 to 306-5). The scope of this disclosure should therefore not be limited by reference to device-specific details.

The operation of a particular implementation is described with reference to the flowchart of FIG. 5. In the depicted implementation, a constraint on the duration(s) of the audio component(s) of a media presentation is imposed in conjunction with the production of the video and audio components of the media presentation which, in this example, is secondary content intended to be dynamically inserted or stitched with primary content. Such secondary content may include both static and dynamic secondary content. Static secondary content may include content that is relatively unchanging, such as legal notices, studio or production company logos, additional credits, pre-roll media, post-roll media, etc. Dynamic secondary content may include content that changes more frequently, such as advertisements, public service announcements, etc. It should also be noted that implementations enabled by the present disclosure need not be limited to content that is typically thought of as secondary content, but may be applied to the production of any type of content.

Figure 5:
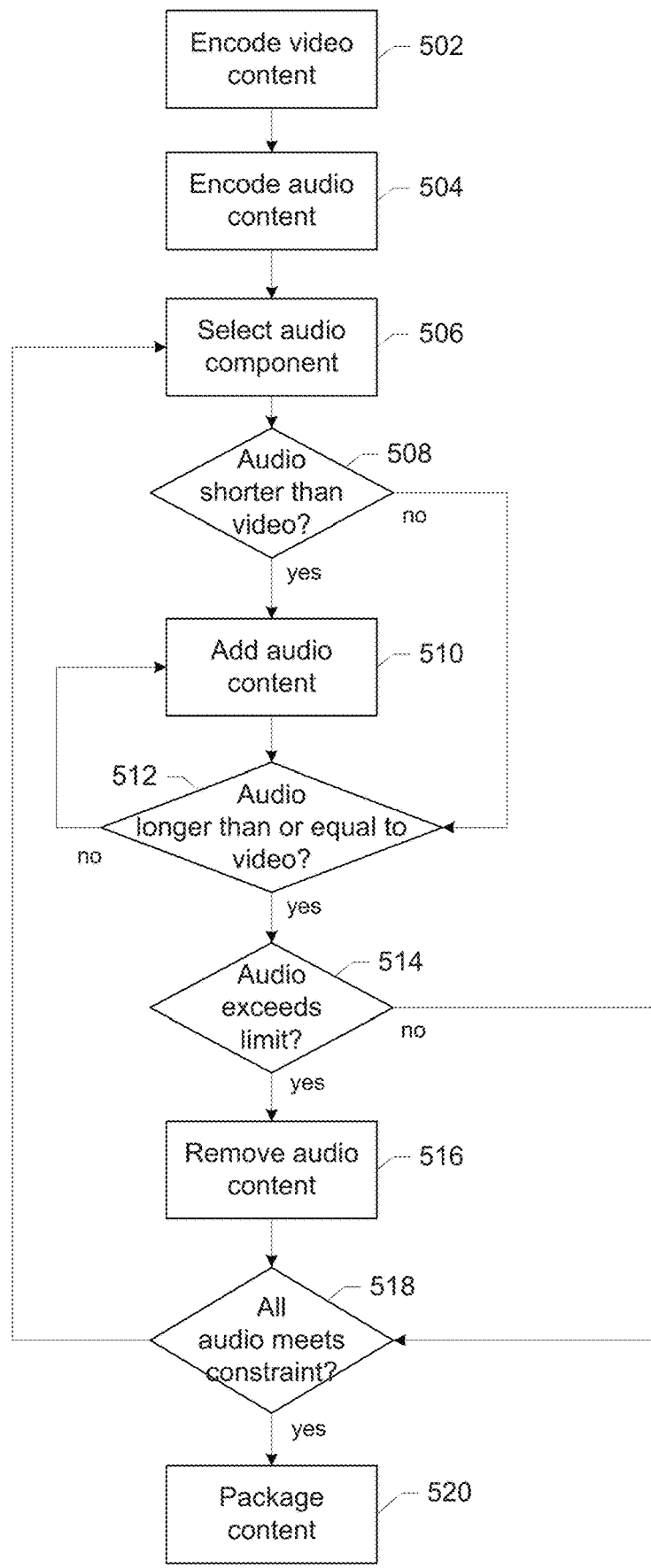
FIG. 5 is a flowchart illustrating operation of a particular class of implementations enabled by the present disclosure.

Turning now to FIG. 5, video content is encoded using any of a wide variety of video codecs (502). Suitable video codecs include, but are not limited to Advanced Video Coding (AVC or H.264), High-Efficiency Video Coding (HEVC or H.265), AV1, VP8, VP9, among others. The resulting encoded video component is characterized by a corresponding video duration.

Audio content associated with the video content is also encoded using any of a wide variety of audio codecs (504). Suitable audio codecs include, but are not limited to, Advanced Audio Coding (AAC) and Dolby® Digital Plus (DD+) stream, among others. There may be one or multiple encoded audio components produced using different codecs. Each audio component is characterized by a corresponding audio duration.

For each audio component (506), it is determined whether the corresponding audio duration is shorter than the duration of video component (508). If the duration of the audio component is shorter than the video duration, one or more audio frames is added to the audio component such that the duration of the audio component is greater than or equal to the video duration (510).

If the duration of the audio component is determined to be equal to or longer than the video duration (512), it is determined whether the audio duration is longer than the video duration by more than a defined upper limit (514). According to a particular implementation, this upper limit is defined by the duration of one audio frame. However, implementations are contemplated in which the upper limit may be defined differently, i.e., either as multiple frame durations, the duration of one or more units of compression for a given audio codec, a specified duration of time, etc. Implementations are also contemplated in which no upper limit is specified or enforced, relying instead on the likelihood that the duration(s) of a media presentation's audio component(s) will not exceed the duration of the video component by a problematic amount.

If the upper limit is exceeded, one or more audio frames of the audio component are removed such that the duration of the audio component remains greater than or equal to the video duration but within one audio frame duration of the video duration (516). Once all of the audio components satisfy the constraint (518), the video component and the audio component(s) are packaged for delivery as streaming content (520). According to various implementations, this packaging may employ a variety of container formats suitable for streaming content such as, for example, MP4 and CMAF, among others.

Depending on the container format employed and the sampling frequency of the audio codec, the duration of an audio frame may vary. For example, an audio frame of an MP4 file may include different numbers of samples (e.g., 960, 1024, or 1536), and a codec may employ different sampling frequencies (e.g., 22.05 kHz, 44.1 kHz, or 48 kHz). The duration of an audio frame may be derived by dividing the number of samples per frame by the sampling frequency. For example, using 1024 and 48 kHz, the frame duration is given by 1024/48000≈21 milliseconds. In another example, using 1536 and 48 kHz, the frame duration is given by 1536/48000=32 milliseconds. But as should be appreciated, the frame duration can vary widely with different implementations.

In addition, implementations are contemplated in which the upper limit imposed on the duration of an audio component and/or the unit of audio content added to or removed from an audio component to meet the constraint may vary. For example, the upper limit might be defined relative to the duration of the video component based on one or more frames of audio, one or more units of compression associated with a particular audio codec, one or more units of audio data defined by a container file format, or a specified duration of time. Similarly, the amount of audio content that is either added to or removed from an audio component to meet the constraint may be done using increments corresponding to one or more frames of audio, one or more compression units, or one or more units of audio data defined by a container file format. The upper limit imposed on the duration of an audio component and/or the unit of audio content added to or removed from an audio component may also be informed or enabled by variable frame size and/or sub-frame manipulation as enabled by some audio codecs such as, for example, the AC-4 codec.

As will be discussed, by constraining the duration(s) of the audio component(s) of a media presentation relative to the duration of the video component as described herein, dynamic insertion of secondary content may be more compatible with a larger percentage of media players and client devices.

Figure 6:
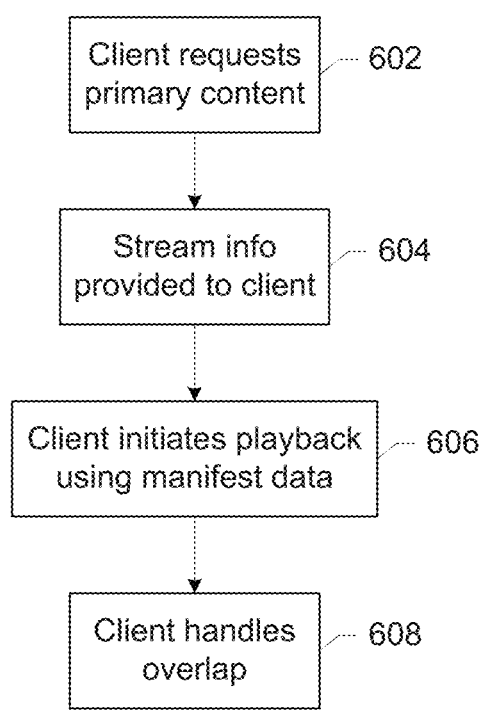
FIG. 6 is a flowchart illustrating operation of a particular class of implementations enabled by the present disclosure.

The operation of a particular implementation is described with reference to the flowchart of FIG. 6. The described implementation makes reference to the use of the Dynamic Adaptive Streaming over HTTP (DASH) protocol. However, it should be noted that implementations enabled by the present disclosure are not so limited.

A client device (e.g., any of client devices 306) sends a request (e.g., an HTTP request) to a streaming content service for playback of selected primary content (602). The primary content may be, for example, live content depicting a live event, broadcast content, or video-on-demand (VOD) content (e.g., movies or TV shows). In response to the request, the content service provides the client device with the information the client device needs to acquire a stream of the content or to download the content (604). This may include, for example, one or more DRM licenses, a decryption key, content metadata, and manifest data with which the client device can generate properly formatted requests for fragments of the media presentation at various quality levels. The type of manifest requested will correspond to the adaptive bitrate streaming protocol used by the client device, e.g., Dynamic Adaptive Streaming over HTTP (DASH).

The client initiates playback using the manifest data to generate requests for content fragments to specific URLs that correspond to successive ranges of content identified in the manifest data (606). The manifest data may represent different periods of content, each of which corresponds to either a portion of the primary content or an item of secondary content (e.g., an ad or item of static content) to be stitched with the primary content.

According to a particular implementation, the manifest data are generated to define the period duration for each period of secondary content to be equal to the duration of the inserted content's video component. This is to be contrasted with the conventional approach illustrated in FIG. 1 in which the period duration of inserted content is defined by the longest of the video and audio components. By instead defining the period duration of the inserted content to correspond to the duration of its video component, and because the audio component(s) of the inserted content are at least as long or longer than the video component, it is guaranteed that there will be no media timeline gaps when transitioning from a secondary content period to the following content period, whether it be secondary or primary content.

It will be understood from the foregoing by those of skill in the art that, because the duration(s) of the audio component(s) of inserted content is/are often longer than the video component, there is potential for an audio component from one content period to overlap in the media timeline with the audio of the following period. This is preferable to handling either gaps or overlaps of video content for one or more reasons. For example, audio frames are independent and can be handled by a packager in the compressed domain, i.e., frames can be either added or dropped without being decoded. By contrast, such manipulation should not be done for video frames because video frames are reordered during encoding and have serial dependencies between frames and therefore must be decoded before such decisions can be made. Some platforms do not even provide APIs for this purpose.

In addition, creating the potential for overlap rather than gaps may be advantageous because it is typically easier to drop existing information (e.g., one or more audio frames) than to add information (which requires creation or introduction of new information). Moreover, for implementations that enforce an upper limit on the duration of the audio component(s), there can be minimal overlap to be handled by the media players on client devices.

Referring back to FIG. 6, the media player of the client device may handle the overlap of the audio components of consecutive content periods in a variety of ways (608). According to some implementations, the media player may handle such an overlap by dropping audio frames during playback. For example, the media player might be configured to detect from the manifest data if there is overlap of the audio from one period to the next period (e.g., by comparing the audio duration with the period duration). In some implementations, the existence and extent of any overlap may be explicitly provided in the manifest data. In response to detection of an overlap, the media player may be configured to automatically drop one or more frames (or one or more compression units) of the overlapping audio.

Alternatively, the media player may decide not to drop audio content depending on whether allowing playback of the overlapping audio might delay playback of the audio of the subsequent period in a way that would be noticeable to a human viewer. That is, for implementations in which an upper limit is enforced on the duration of audio components, any audio delay introduced by an overlap might not have to be handled every period transition, and may be handled only when the cumulative delay reaches some threshold, e.g., 25 to 125 milliseconds.

Moreover, for implementations in which the upper limit on the duration of audio components is small (e.g., one audio frame or less), even media players that have no logic for specifically handling an overlap can continue to operate reliably for some time before an accumulated audio delay will be perceptible to humans.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer program product, comprising one or more non-transitory computer-readable media having computer program instructions stored therein, the computer program instructions being configured such that, when executed by one or more computing devices, the computer program instructions cause the one or more computing devices to:
   encode video content of a media presentation using the High Efficiency Video Coding codec to generate a video component of the media presentation, the video component having a video duration associated therewith;
   encode audio content of the media presentation using the Advanced Audio Coding codec to generate an audio component of the media presentation, the audio component having an audio duration associated therewith;
   if it is determined that the audio duration is shorter than video duration, add one or more audio frames to the audio component such that the audio duration is greater than or equal to the video duration, and the audio duration comprises an upper limit that is dynamically determined based at least on the video duration and a respective duration of each of the one or more audio frames, the respective duration being based on a quantity of audio samples divided by a sampling frequency, wherein the upper limit is enforced responsive to a cumulative audio delay being at or exceeding a prescribed threshold;
   if it is determined that the audio duration is longer than the video duration, determine whether the audio duration is longer than the upper limit;
   if it is determined that the audio duration is longer than the upper limit, remove one or more audio frames from the audio component such that the audio duration is greater than or equal to the video duration, and the audio duration comprises the upper limit that is dynamically determined based at least on the video duration and the respective duration of each of the one or more audio frames; and
   package the video component and the audio component as parts of the media presentation using a fragmented MP4 container.

2. The computer program product of claim 1, wherein the computer program instructions are further configured such that, when executed by one or more computing devices, the computer program instructions cause the one or more computing devices to generate manifest data for the media presentation, the manifest data specifying a media presentation duration equal to the video duration.

3. The computer program product of claim 2, wherein the manifest data correspond to the Dynamic Adaptive Streaming over HTTP (DASH) protocol.

4. The computer program product of claim 1, wherein the one or more audio frames added to the audio component include no audio information.

5. The computer program product of claim 1, wherein the computer program instructions are further configured such that, when executed by one or more computing devices, the computer program instructions cause the one or more computing devices to stream at least the fragmented MP4 container in response to a playback request from a client device.

6. A computer-implemented method, comprising:
   encoding video content of a media presentation to generate a video component of the media presentation, the video component having a video duration associated therewith;
   encoding audio content of the media presentation to generate one or more audio components of the media presentation, each of the one or more audio components having an audio duration associated therewith;
   enforcing a constraint on a first audio component of the one or more audio components such that the audio duration of the first audio component is greater than or equal to the video duration and less than an upper limit that is dynamically determined based at least on (i) the video duration and (ii) a duration based on a quantity of audio samples divided by a sampling frequency associated with the first audio component, wherein the upper limit is enforced responsive to a cumulative audio delay being at or exceeding a prescribed threshold,
   wherein the enforcing of the constraint on the first audio component includes removing one or more audio frames from the first audio component if the audio duration of the first audio component is longer than the video duration and the upper limit, and adding one or more audio frames to the first audio component if the audio duration of the first audio component is shorter than the video duration; and
   packaging the video component and the one or more audio components as parts of the media presentation.

7. The method of claim 6, wherein the constraint requires that the audio duration of each audio component is less than the sum of the video duration and a specified duration.

8. The method of claim 7, wherein the specified duration corresponds to one audio frame duration.

9. The method of claim 6, further comprising generating manifest data for the media presentation, the manifest data specifying a media presentation duration equal to the video duration.

10. The method of claim 9, wherein the manifest data correspond to the Dynamic Adaptive Streaming over HTTP (DASH) protocol.

11. The method of claim 6, wherein encoding the audio content includes encoding the audio content using a first audio codec to generate a first audio component, and encoding the audio content using a second audio codec to generate a second audio component, and wherein the constraint employs a first audio frame duration corresponding to the first audio codec for the first audio component and a second audio frame duration corresponding to the second audio codec for the second audio component.

12. The method of claim 6, further comprising enforcing the constraint on all of the one or more audio components prior to the packaging of the video component and the one or more audio components.

13. A system, comprising memory and one or more processors configured to:
   encode video content of a media presentation to generate a video component of the media presentation, the video component having a video duration associated therewith;
   encode audio content of the media presentation to generate one or more audio components of the media presentation, each of the one or more audio components having an audio duration associated therewith;

enforce a constraint on a first audio component of the one or more audio components such that the audio duration of the first audio component is greater than or equal to the video duration but less than an upper limit dynamically determined based at least on (i) the video duration and (ii) a duration based on a quantity of audio samples divided by a sampling frequency associated with the first audio component, wherein the upper limit is enforced responsive to a cumulative audio delay being at or exceeding a prescribed threshold, wherein the enforcement of the constraint on the first audio component includes removing one or more audio frames from the first audio component if the audio duration of the first audio component is longer than the video duration and the upper limit, and adding one or more audio frames to the first audio component if the audio duration of the first audio component is shorter than the video duration; and package the video component and the one or more audio components as parts of the media presentation.

14. The system of claim 13, wherein the constraint requires that the audio duration of each audio component is less than the sum of the video duration and a specified duration.

15. The system of claim 14, wherein the specified duration corresponds to one audio frame duration.

16. The system of claim 13, wherein the memory and one or more processors are further configured to generate manifest data for the media presentation, the manifest data specifying a media presentation duration equal to the video duration.

17. The system of claim 16, wherein the manifest data correspond to the Dynamic Adaptive Streaming over HTTP (DASH) protocol.

18. The system of claim 13, wherein the memory and one or more processors are configured to encode the audio content by encoding the audio content using a first audio codec to generate a first audio component, and encoding the audio content using a second audio codec to generate a second audio component, and wherein the constraint employs a first audio frame duration corresponding to the first audio codec for the first audio component and a second audio frame duration corresponding to the second audio codec for the second audio component.

* * * * *